US012724468B2

(12) United States Patent
Zhang et al.

(10) Patent No.: US 12,724,468 B2
(45) Date of Patent: Sep. 1, 2026

(54) FRAME

(71) Applicant: CANAAN CREATIVE CO., LTD., Beijing (CN)

(72) Inventors: Shaohua Zhang, Beijing (CN); Nangeng Zhang, Beijing (CN)

(73) Assignee: CANAAN CREATIVE CO., LTD., Beijing (CN)

( * ) Notice: Subject to any disclaimer, the term of this patent is extended or adjusted under 35 U.S.C. 154(b) by 536 days.

(21) Appl. No.: 18/005,340

(22) PCT Filed: Jul. 12, 2021

(86) PCT No.: PCT/CN2021/105784
§ 371 (c)(1),
(2) Date: Jan. 12, 2023

(87) PCT Pub. No.: WO2022/012470
PCT Pub. Date: Jan. 20, 2022

(65) Prior Publication Data

US 2023/0280802 A1 Sep. 7, 2023

(30) Foreign Application Priority Data

Jul. 14, 2020 (CN) ......................... 202021383314.1

(51) Int. Cl.
*G06F 1/18* (2026.01)
*G06F 1/183* (2026.01)

(52) U.S. Cl.
CPC .............. *G06F 1/182* (2013.01); *G06F 1/183* (2013.01); *G06F 1/189* (2013.01)

(58) Field of Classification Search
CPC ........................................................ H05K 5/00
See application file for complete search history.

(56) References Cited

U.S. PATENT DOCUMENTS 6,434,018 B1 8/2002 Waltz
2009/0294606 A1* 12/2009 Chen ....................... G06F 1/187 312/223.2

(Continued)

FOREIGN PATENT DOCUMENTS

CN 102081431 A * 6/2011
CN 109885142 A 6/2019

(Continued)

OTHER PUBLICATIONS

International Search Report mailed Oct. 12, 2021 in PCT Application No. PCT/CN2021/105784.

*Primary Examiner* — Jerry Wu
(74) *Attorney, Agent, or Firm* — Sheppard Mullin Richter & Hampton LLP

(57) ABSTRACT

Disclosed is a frame, comprising a frame body and a control module. The frame body comprises a bottom plate, a top plate and a side plate, wherein the side plate is supported between the bottom plate and the top plate; a power source module accommodation area and a computing module accommodation area are defined between the bottom plate and the top plate; the bottom plate is provided with a frame slideway; and a power source module and a computing module respectively enter and exit by means of the frame slideway, and are fixed in the power source module accommodation area and the computing module accommodation area. The control module is connected to the top plate. The aim of the present invention is to provide a frame, which is used for an integrated computing unit, and which has a small and lightweight structure, a rational layout and is low cost.

17 Claims, 6 Drawing Sheets

(56) References Cited

U.S. PATENT DOCUMENTS

| | | | |
|---|---|---|---|
| 2017/0156233 A1 | 6/2017 | Moss et al. | |
| 2019/0059172 A1 | 2/2019 | Gupta et al. | |
| 2020/0229311 A1* | 7/2020 | Wu | H05K 7/1487 |

FOREIGN PATENT DOCUMENTS

| | | | | |
|---|---|---|---|---|
| CN | 110196623 A | 9/2019 | | |
| CN | 209657209 U | 11/2019 | | |
| CN | 209962183 U | 1/2020 | | |
| CN | 210109707 U | 2/2020 | | |
| CN | 110989787 A | * 4/2020 | | G06F 1/20 |
| CN | 210294963 U | 4/2020 | | |
| KR | 20150130257 A | 11/2015 | | |

* cited by examiner

FRAME

CROSS REFERENCE TO RELATED APPLICATIONS

This application is a U.S. National Stage Application of International Application No. PCT/CN2021/105784, filed on Jul. 12, 2021, which claims priority to Chinese Patent Application No. 202021383314.1, filed on Jul. 14, 2020. The contents of each of which are hereby incorporated by reference in their entirety.

TECHNICAL FIELD

The present invention relates to a frame structure, in particular to a frame structure for computing devices.

BACKGROUND

A computing device is an electronic device used for high-speed computing, such as an electronic device used to run a specific algorithm and communicate with a remote server to obtain a corresponding virtual currency. The progress of existing industries has promoted the evolution of various devices to be cooled, including computing devices, towards automation and intelligence, and the optimization of computing device performance requires the support by more and more computing chips. Therefore, the integration of computing devices is the current development trend. In order to achieve integration, it is necessary to design a modular product that facilitates integration.

SUMMARY

The object of the present invention is to provide a frame for an integrated computing unit, which has a small and lightweight structure.

In order to achieve the above object, the frame of the present invention comprises a frame body and a control module, the frame body comprising a bottom plate, a top plate, and side plates, the sides plate being supported between the bottom plate and the top plate, a power source module accommodation area and a computing module accommodation area being defined between the bottom plate and the top plate, and the bottom plate being provided with a frame slideway, a power source module and computing modules entering and exiting by means of the frame slideway, and being fixed in the power source module accommodation area and the computing module accommodation area respectively, and the control module being connected to the top plate.

In an embodiment of the above frame, the computing module accommodation area comprises a first computing module accommodation area and a second computing module accommodation area, and the first computing module accommodation area and the second computing module accommodation area are located on two sides of the power source module accommodation area respectively.

In an embodiment of the above frame, the bottom plate and the top plate are respectively sheet metal parts.

In an embodiment of the above frame, the bottom plate comprises a first bottom plate portion corresponding to the first computing module accommodation area, a second bottom plate portion corresponding to the power source module accommodation area, and a third bottom plate portion corresponding to the second computing module accommodation area, and the frame slideway comprises bottom plate computing board slideways, the first bottom plate portion and the third bottom plate portion respectively have punched slot holes arranged in pairs, and the bottom plate computing board slideways are formed between punched side edges of adjacent punched slot holes.

In an embodiment of the above frame, the frame slideway further comprises a bottom plate power source slideway, and the bottom plate power source slideway is formed between the punched side edges of punched slot holes adjacent to the second bottom plate portion on the first bottom plate portion and the third bottom plate portion.

In an embodiment of the above frame, the second bottom plate portion has a plurality of drain ports arranged in a matrix.

In an embodiment of the above frame, the top plate comprises a first top plate portion corresponding to the first computing module accommodation area, a second top plate portion corresponding to the power source module accommodation area, and a third top plate portion corresponding to the second computing module accommodation area, the first top plate portion and the third top plate portion respectively have punched slot holes arranged in pairs, and top plate computing board slideways corresponding to the bottom plate computing board slideways are formed between the punched side edges of adjacent punched slot holes.

In an embodiment of the above frame, a height of the second top plate portion is higher than those of the first top plate portion and the third top plate portion.

In an embodiment of the above frame, a handle is connected to the top plate, and the highest position of the handle is higher than the second top plate portion.

In an embodiment of the above frame, the second top plate portion comprises a concave-down power source positioning recess.

In an embodiment of the above frame, the second top plate portion comprises a plurality of drain ports.

In an embodiment of the above frame, the second top plate portion comprises at least one functional opening.

In an embodiment of the above frame, the control module comprises a network cable interface, and the network cable interface is higher than the second top plate portion.

In an embodiment of the above frame, the frame further comprises a front side plate, and the bottom plate comprises a bottom plate connecting slot, a bottom side edge of the front side plate being connected through the bottom plate connecting slot, and a top portion of the front side plate being connected with the top plate by a connecting piece.

In an embodiment of the above frame, the frame further comprises a control plate connection cover, the control module is connected in the control plate connection cover, and the control plate connection cover is connected to a rear side of the top plate.

In an embodiment of the above frame, the frame comprises a rear side cover, and the rear side cover comprises a side plate connecting slot, the control plate connection cover being connected with a top portion of the rear side cover through the side plate connecting slot, and a bottom portion of the rear side cover being connected with the bottom plate through a connecting piece.

In an embodiment of the above frame, a bottom portion of the rear side cover is provided with a drain port.

In an embodiment of the above frame, the side plate is a bar-shaped profile.

The beneficial effect of the invention lies in that the frame structure of the invention is simple, the layout is reasonable, and the cost is low.

The present invention will be described in detail below in conjunction with the accompanying drawings and specific embodiments, but not as a limitation of the present invention.

Figure 1:
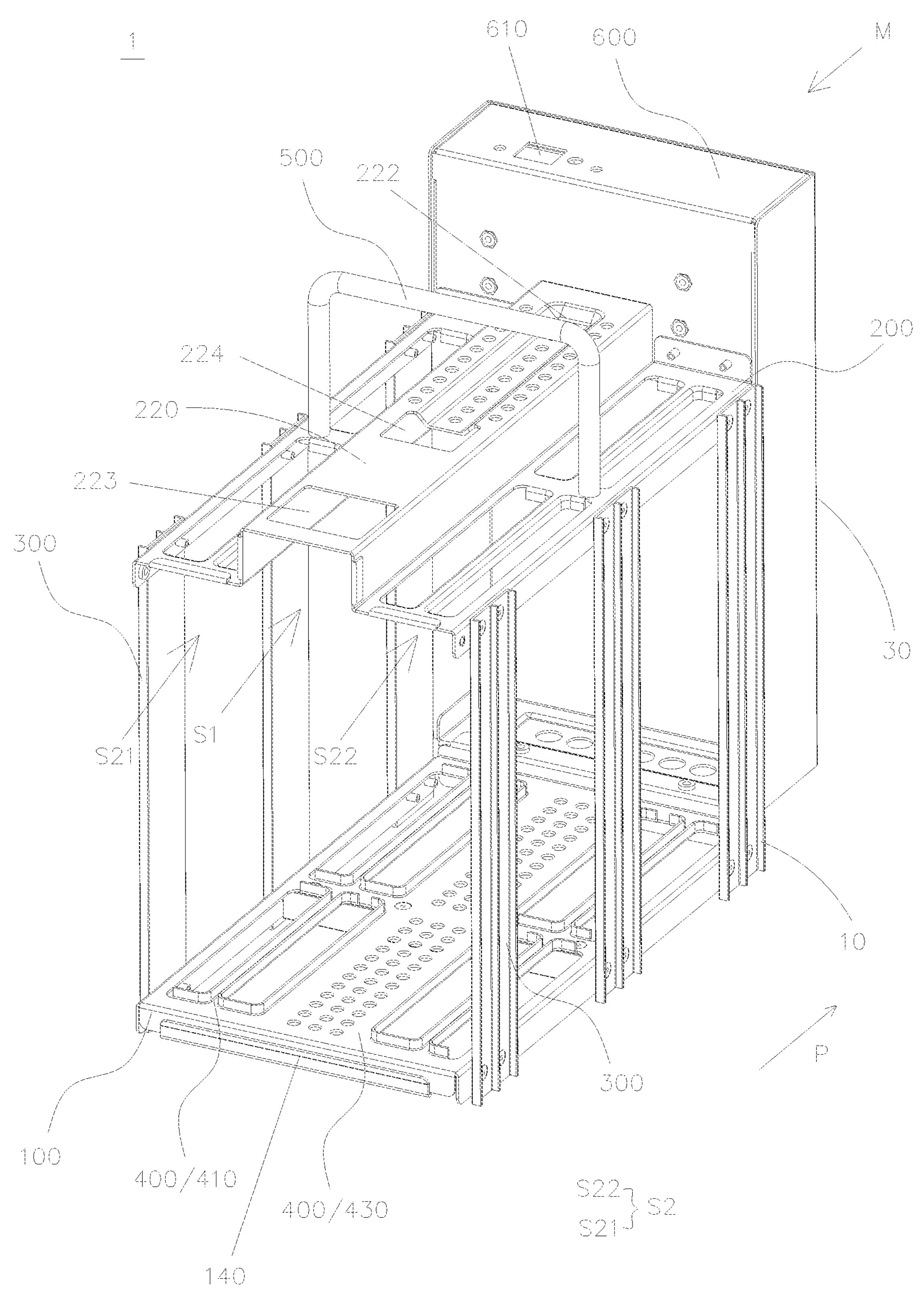
FIG. 1 is a three-dimensional structural view (1) of an embodiment of the frame of the present invention.

1: Frame
10: Frame body
20: Control module
21: Network cable interface
30: Rear side cover
31: Side plate connecting slot
32: Drain port
40: Front side plate
100: Bottom plate
110: First bottom plate portion
111, 112: Punched slot hole
111*a*, 112*a*, 112*b*: Punched side edge
120: Second bottom plate portion
121: Drain port
130: Third bottom plate portion
132: Punched slot hole
132*b*: Punched side edge
140: Bottom plate connecting slot
200: Top plate
210: First top plate portion
211, 212: Punched slot hole
211*a*, 212*a*: Punched side edge
220: Second top plate portion
221: Drain port
222: Power source positioning recess
223: Power source interface opening
224: Power source switch opening
230: Third top plate portion
300: Side plate
400: Frame slideway
410: Bottom plate computing board slideways
420: Top plate computing board slideways
430: Bottom plate power source slideway
440: Top plate power source slideway
500: Handle
600: Control plate connection cover
610: Interface portion
S1: Power source module accommodation area
S2: Computing module accommodation area
S21: First computing module accommodation area
S22: Second computing module accommodation area
P: Installation direction

DETAILED DESCRIPTION

The technical solution of the present invention will be described in detail below in conjunction with the accompanying drawings and specific embodiments for further understanding of the objectives, solutions and effects of the present invention. But it is not intended to limit the scopes of the appended claims of the present invention.

References to “an embodiment”, “another embodiment”, “present embodiment” and the like in the specification mean that the described embodiment may comprise specific features, structures or characteristics, but not every embodiment has to comprise these specific features, structures or characteristics. Furthermore, such expressions do not mean the same embodiment. Furthermore, when specific features, structures or characteristics are described in conjunction with an embodiment, whether or not there is an explicit description, it has been indicated that it is within the knowledge of those skilled in the art to combine such features, structures or characteristics into other embodiments.

Certain terms are used in the description and the following claims to refer to specific components or parts, and those skilled in the art should understand that users or manufacturers of the technology may refer to the same components or parts with different designations or terms. This description and the following claims do not use different designations or terms as the way to distinguish components or parts, but distinguish the components or parts by their differences in functionalities as the distinguishing criterion. “Comprise” and “include” mentioned in the entire specification and following claims are open-ended terms, they therefore should be interpreted as “include but not limited to.” In addition, the word “connect” herein comprises any means for direct and indirect connection.

It should be noted that, in the description of the present invention, in the case where orientations or positional relationships indicated by terms such as “latitudinal”, “longitudinal”, “upper”, “lower”, “front”, “rear”, “left”, “right”, “vertical”, “horizontal”, “top”, “bottom”, “inner” and “outer” occur, they are based on the orientations or positional relationships shown in the drawings, and are only for the convenience of describing the present invention and simplifying the description. They do not indicate or imply that the devices or elements referred to must have a specific orientation or be constructed and operated in a specific orientation, and thus should not be construed as limiting the invention. For the sake of clarity, the sequential terms such as “first”, “second”, “third” and “fourth” mentioned herein are used to distinguish an element, region, or part from another same or similar element, region, part, rather than used to limit specific elements, regions, and parts.

Figure 2:
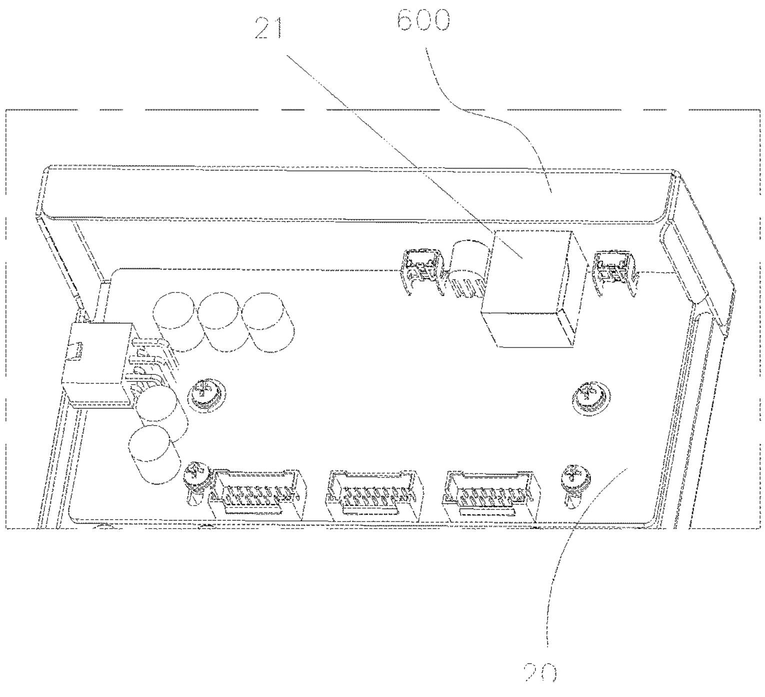
FIG. 2 is a partial view of the frame of FIG. 1 in the M direction (showing the control module)

As shown in FIGS. 1 and 2, the frame 1 of the present invention comprises a frame body 10 and a control module 20. The frame body 10 comprises a bottom plate 100, a top plate 200 and side plates 300, and the side plates 300 are supported between the bottom plate 100 and the top plate 200, wherein side plates 300 are supported on both sides of the bottom plate 100 and the top plate 200, so that a power source module accommodation area S1 and a computing module accommodation area S2 are defined between the bottom plate 100 and the top plate 200. In addition, the bottom plate 100 is provided with a frame slideway 400. The power source module enters and exits through the frame slideway 400 and is fixed in the power source module accommodation area S1, the computing modules enter and exit through the frame slideway 400 and are fixed in the computing module accommodation area S2, and the control module 20 is connected to the top plate 200. The frame of the present invention is especially suitable for computing units with immersed cooling.

Wherein, the computing module accommodation area S2 may be arranged on one side of the power source module accommodation area S1, or the computing module accommodation area S2 may be located on both sides of the power source module accommodation area S1.

In the present embodiment, the computing module accommodation area S2 comprises a first computing module accommodation area S21 and a second computing module accommodation area S22, and the first computing module accommodation area S21 and the second computing module accommodation area S22 are respectively located on two sides of the power source module accommodation area S1. The computing module accommodation areas S21 and S22 are symmetrically located on the two sides of the power source module accommodation area S1, and the overall weighting of the computing device is more reasonable.

In addition, the frame 1 has an installation direction P, and the frame slideway 400 extends in the installation direction P, through which the power source module and computing modules enter and exit the power source module accommodation area S1 and computing module accommodation area S2 respectively.

In the present invention, the bottom plate 100 and the top plate 200 of the frame 1 are respectively sheet metal parts, and desired functional openings or recesses are formed on the sheet metal parts by processes such as stamping, bending and other processes. Profile materials with ribs are directly used as the side plates 300, they are cheap and can ensure the supporting strength. Of course, the above are only examples, and the materials of the bottom plate 100 and the top plate 200 of the present invention are not limited to sheet metal parts; other materials that may achieve the same function can also be used, and the present invention is not limited thereto.

Figure 3:
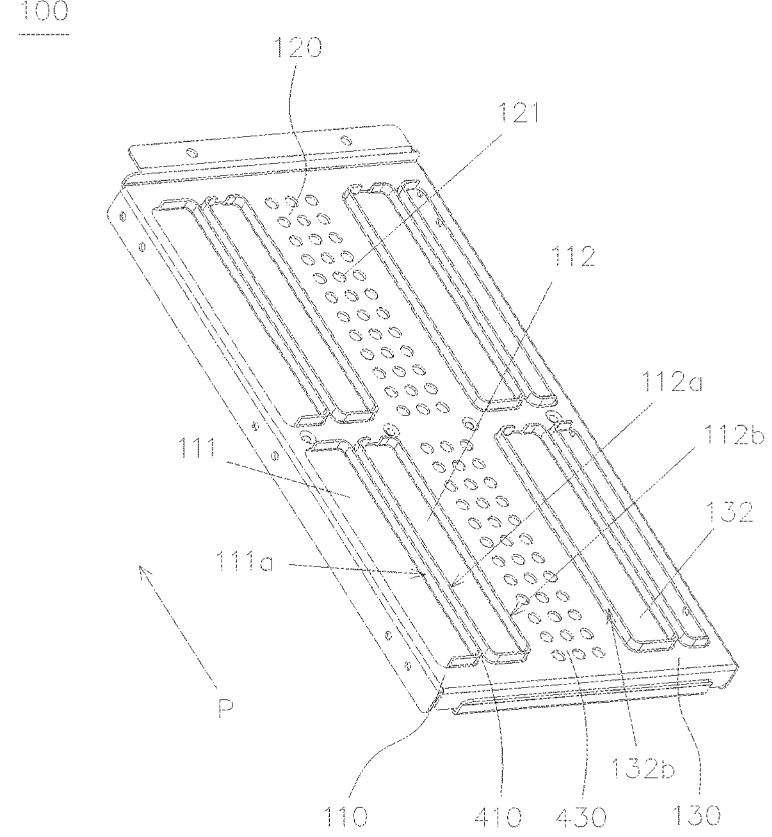
FIG. 3 is a three-dimensional structural view of an embodiment of the bottom plate of the frame of the present invention.

As shown in FIG. 3, the bottom plate 100 comprises a first bottom plate portion 110, a second bottom plate portion 120, and a third bottom plate portion 130. Referring to FIG. 1, the first bottom plate portion 110 corresponds to the first computing module accommodation area S21, the second bottom plate portion 120 corresponds to the power source module accommodation area S1, and the third bottom plate portion 130 corresponds to the second computing module accommodation area S22. That is, the first computing module accommodation area S21 is formed between the first bottom plate portion 110 and the top plate 200, the power source module accommodation area S1 is formed between the second bottom plate portion 120 and the top plate 200, and the second computing module accommodation area S22 is formed between the third bottom plate portion 130 and the top plate 200.

The frame slideway 400 comprises bottom plate computing board slideways 410, the first bottom plate portion 110 and the third bottom plate portion 130 respectively have punched slot holes arranged in pairs, and the bottom plate computing board slideways 410 are formed between punched side edges of adjacent punched slot holes.

Taking the first bottom plate portion 110 as an example, the first bottom plate portion 110 comprises a punched slot hole 111 and a punched slot hole 112. The punched slot hole 111 comprises a punched side edge 111*a*, and the punched slot hole 112 comprises a punched side edge 112*a*. The punched side edge 111*a* and the punched side edge 112*a* are opposite to each other and parallel to the installation direction P. A bottom plate computing board slideway 410 is formed between the punched side edge 111*a* and the punched side edge 112*a*. The computing module enters and exits the computing module accommodation area S21 through the bottom plate computing board slideway 410. In the present embodiment, the first bottom plate portion 110 is provided with two sets of punched slot holes 111 and 112 in the installation direction P, so as to make the slideway more stable in addition to ensuring the strength of the bottom plate.

Figure 4:
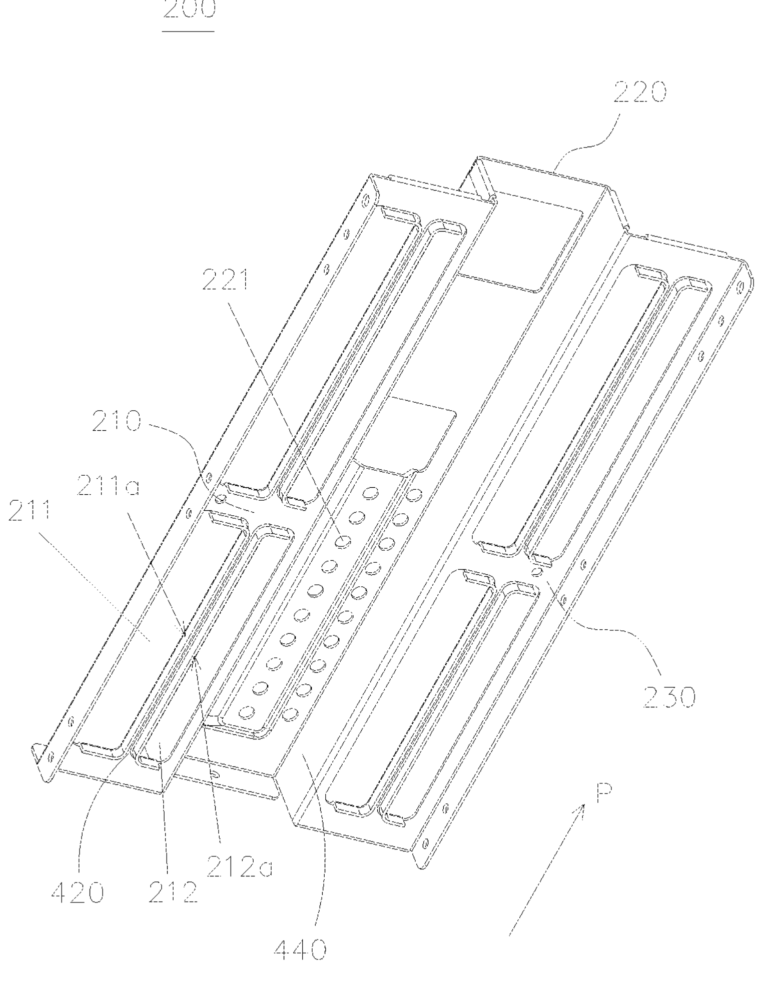
FIG. 4 is a three-dimensional structural view of an embodiment of the top plate of the frame of the present invention.

Correspondingly, as shown in FIG. 4, the top plate 200 comprises a first top plate portion 210, a second top plate portion 220 and a third top plate portion 230. Referring to FIG. 1 and FIG. 3, the first computing module accommodation area S21 is formed between the first top plate portion 210 and the first bottom plate portion 110, the power source module accommodation area S1 is formed between the second top plate portion 220 and the second bottom plate portion 120, and the second computing module accommodation area S22 is formed between the third top plate portion 230 and the third bottom plate portion 130.

In order to make the slideway fixing structure more stable, top plate computing board slideways 420 corresponding to the bottom plate computing board slideways 410 are provided on the top plate.

Taking the first top plate portion 210 as an example, as shown in FIG. 4, the first top plate portion 210 comprises a punched slot hole 211 and a punched slot hole 212. The punched slot hole 211 comprises a punched side edge 211*a*, and the punched slot hole 212 comprises a punched side edge 212*a*. The punched side edge 211*a* corresponds to the punched side edge 212*a* and is parallel to the installation direction P. A top plate computing board slideway 420 is formed between the punched side edge 211*a* and the punched side edge 212*a*. The computing module enters and exits the computing module accommodation area S21 through the bottom plate computing board slideway 410 and the top plate computing board slideway 420. Like the first bottom plate portion 110, the first top plate portion 210 is provided with two sets of punched slot holes 211 and punched slot holes 212 in the installation direction P.

The third bottom plate portion 130 has the same structure as the first bottom plate portion 110, the third top plate portion 230 has the same structure as the first top plate portion 210, and also has a plurality of symmetrically arranged punched slot holes forming the computing board slideways, whose description is not repeated here.

The frame slideway 400 further comprises a bottom plate power source slideway 430, which is formed between punched side edges of the punched slot holes adjacent to the second bottom plate portion 120 on the first bottom plate portion 110 and the third bottom plate portion 130. As shown in FIG. 3, the punched slot hole 112 on the first bottom plate portion 110 has a punched side edge 112*b* adjacent to the second bottom plate portion 120, and the punched slot hole 132 on the third bottom plate portion 130 has a punched side edge 112*b* adjacent to the second bottom plate portion 120. The bottom plate power source slideway 430 is formed between the punched side edge 112*b* on the first bottom plate portion 110 and the punched side edge 132*b* on the third bottom plate portion 130.

In addition, FIG. 1 shows the placement mode of the frame of the present invention in use, with the top plate 200 being located above the bottom plate 100. Referring to FIG. 4, the height of the second top plate portion 220 is higher than those of the first top plate portion 210 and the third top plate 230 on the two sides, and the recess formed at the second top plate portion 220 corresponds to the bottom plate power source slideway 430 to form the top plate power source slideway 440.

Referring to FIG. 3 and FIG. 4, the punched slot holes 111, 112 on the first bottom plate portion 110 are vertically corresponding to the punched slot holes 211, 212 on the first top plate portion 210. After the computing module is installed, the punched slot holes 111, 112 and the punched slot holes 211, 212 respectively correspond to the heat sinks on two sides of the computing module. The heat sinks extend vertically, that is, the gap between fins of the heat sinks is combined with the punched slot holes on the upper and lower bottom plate portions to form liquid flow channels, and the heat dissipation liquid for immersed heat dissipation flows smoothly.

The second bottom plate portion 120 and the second top plate portion 220 are also provided with a plurality of drain ports 121, 221. The shape and number of the drain ports are not limited, and they may be arranged linearly, in a matrix, or irregularly. Since the heat dissipation requirement of the power source module is smaller than that of the computing module, generally, the sizes of the drain ports 121, 221 are smaller than the sizes of the punched slot holes 111, 112, 211, 212, which can ensure the load-bearing capacity of the frame and the anti-deformation capacity to some extent.

Referring again to FIG. 1, furthermore, the second top plate portion 220 comprises a concave-down power source positioning recess 222, and the concave-down power source positioning recess 222 holds the power source module tightly to prevent the power source module from shifting and shaking. At least one functional opening is also provided on the second top plate portion 220. In the present embodiment, the second top plate portion 220 comprises a power source interface opening 223 and a power source switch opening 224, which are respectively used for connecting the power cord and switching on and off the power source module. The number and the locations of functional openings may be arranged by those skilled in the art according to actual needs.

A handle 500 is further connected on the top plate 200. Under the placement mode of the frame of the present invention in use shown in FIG. 1, the highest position of handle 500 is higher than the highest position of the top plate 200, that is, the highest position of the handle 500 is higher than the second top plate portion 220. When the liquid for heat dissipation surges from bottom to top, it will not overwhelm the handle 500, which is convenient for operators to operate.

Figure 5:
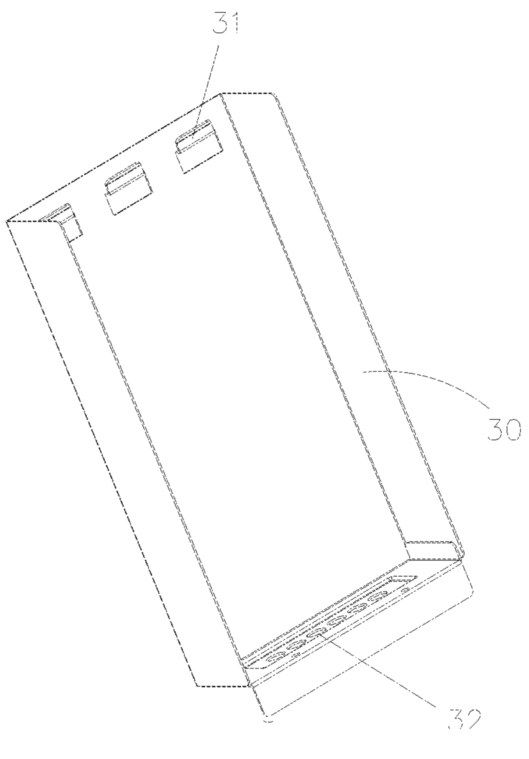
FIG. 5 is a three-dimensional structural view of an embodiment of the rear side cover of the frame of the present invention.

As shown in FIG. 1, FIG. 2 and FIG. 5, the frame body 10 further comprises a control plate connection cover 600. The control module 20 is connected in the control plate connection cover 600, and the control plate connection cover 600 is connected to the rear side of the top plate 200.

The control module 20 comprises a network cable interface 21. Under the placement mode of the frame of the present invention in use shown in FIG. 1, the network cable interface 21 is higher than the highest portion of the top plate 200, that is, higher than the second top plate portion 220. When the liquid for heat dissipation surges from bottom to top, it will not overwhelm the network cable interface 21, which is convenient for operators to operate. The network cable interface 21 is exposed through the interface portion 610 on the top of the control plate connection cover 600, that is, the interface portion 610 is higher than the second top plate portion 220. For example, the interface part 610 may be set at the same height as the handle 500.

As shown in FIG. 1 and FIG. 5, a rear side cover 30 is also comprised. The rear side cover 30 covers the rear side of the frame body 10, wherein the rear side refers to the side connected with the control module 20.

The rear side cover 30 comprises a side plate connecting slot 31, and the control plate connection cover 600 is connected with the top portion of the rear side cover 30 by mean of the side plate connecting slot 31. The bottom portion of the rear side cover 30 is connected with the bottom plate 100 by means of a connecting piece, which for example is a screw. The rear side cover 30 encloses the control module 20 within the frame and covers the respective connection joints of the power source module, control module and computing modules. In addition, the bottom portion of the rear side cover 30 is provided with a drain port 32 for naturally draining liquid accumulated therein when the computing unit is lifted up.

Figure 6:
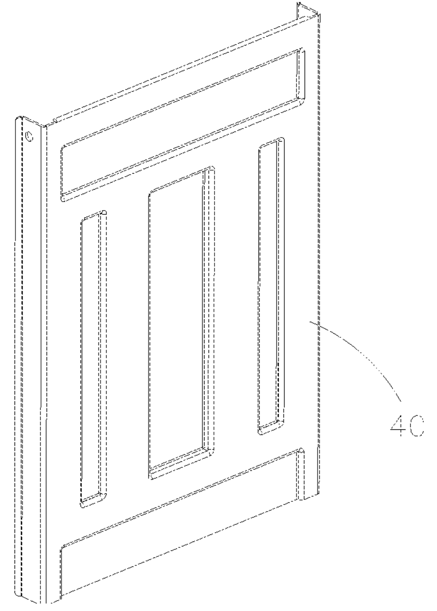
FIG. 6 is a three-dimensional structural view of an embodiment of the front side plate of the frame of the present invention.

As shown in FIG. 1 and FIG. 6, it further comprises a front side plate 40 covering the front side of the frame body 10, wherein the front side refers to the opening side where the power source module and computing modules slide in and out.

The bottom plate 100 comprises a bottom plate connecting slot 140. The bottom side edge of the front side plate 40 is connected through the bottom plate connecting slot 140, and the top portion of the front side plate 40 is connected to the top plate 200 by a connecting piece, which for example is a screw.

It should be noted that in the present invention, the side plates 300 can be implemented in various ways, such as plate-shaped side walls, X-shaped side walls, and H-shaped side walls, as long as they can play a supporting role, and the present invention is not limited thereto.

Figure 7:
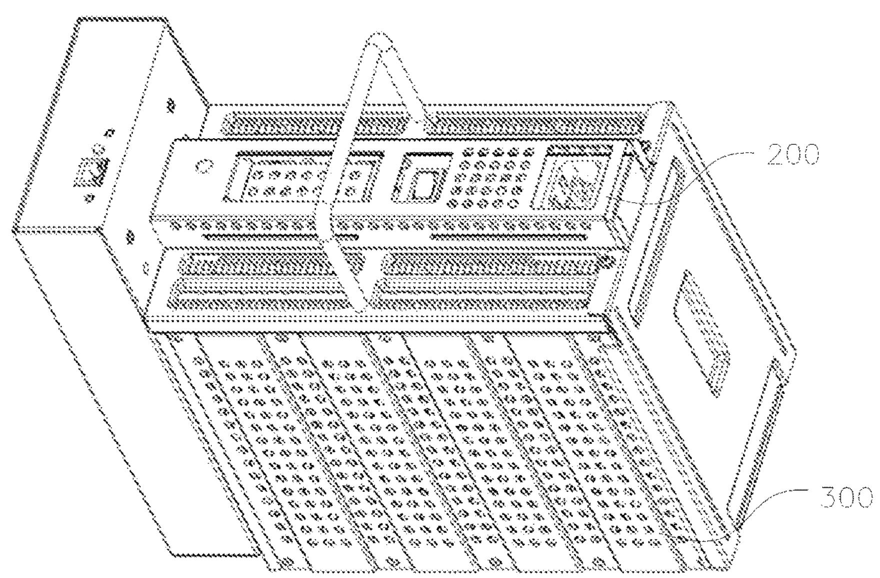
FIG. 7 is a three-dimensional structural view (2) of an embodiment of the frame of the present invention.
Figure 8:
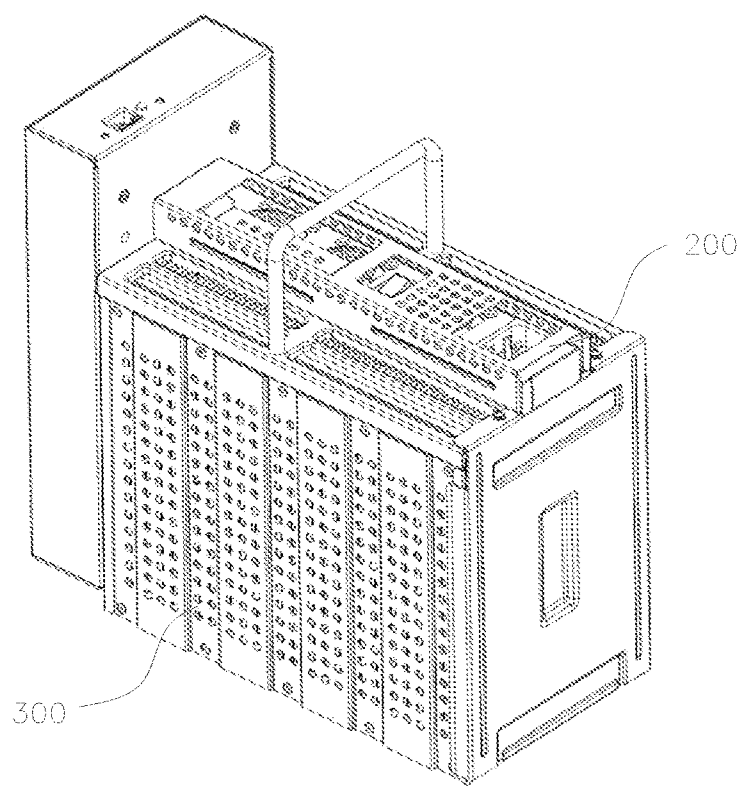
FIG. 8 is a three-dimensional structural view (3) of an embodiment of the frame of the present invention.
Figure 9:
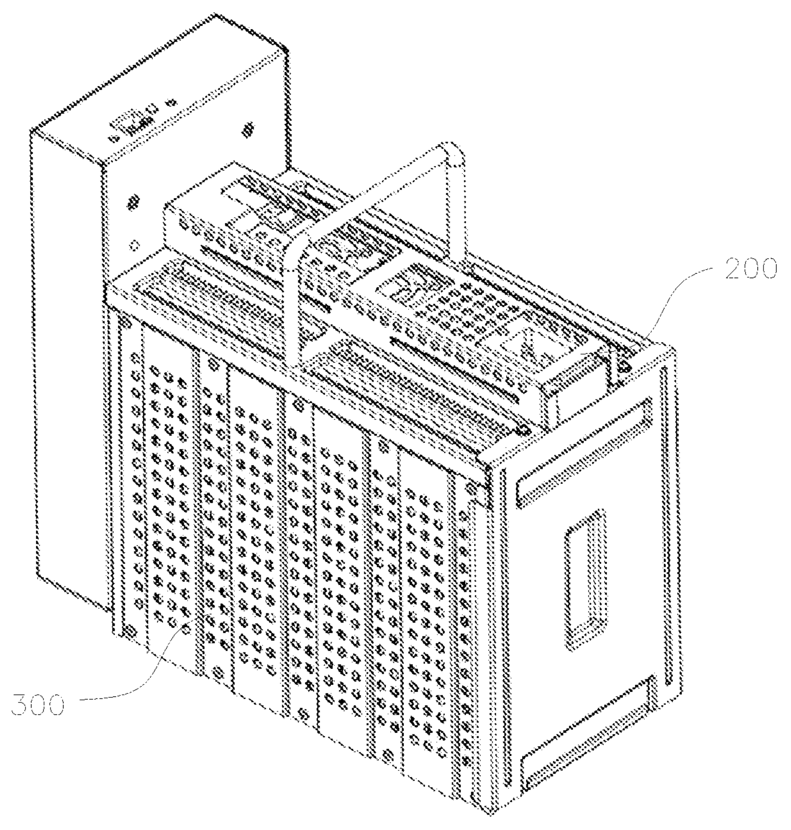
FIG. 9 is a three-dimensional structural view (4) of an embodiment of the frame of the present invention.

As shown in FIG. 7 to FIG. 9, FIG. 7 to FIG. 9 are three-dimensional structural views of different embodiments of the frame of the present invention. The side plates 300 are integral side walls with drain ports and arranged on both sides, which can provide more secure protection for the structures arranged in the frame. The side plates 300 may also be made into concave-convex structures to enhance strength. The side panels 300 are, for example, sheet metal parts, on which required drain ports or concave-convex structures are formed by processes such as punching, bending and other processes. Moreover, the structure of the top plate 200 varies, and the different positions of the power source positioning recess, the power source interface opening, and the power source switch opening provide adaptation for different types of power sources.

No doubt, the present invention may also have other various embodiments, and without departing from the spirit and essence of the present invention, those skilled in the art can make various corresponding changes and variations according to the present invention, but these corresponding changes and variations should belong to the scope of the appended claims of the present invention.

INDUSTRIAL APPLICABILITY

The frame of the present invention comprises a frame body and a control module. The frame body comprises a bottom plate, a top plate and side plates. The side plates are supported between the bottom plate and the top plate. A power source module accommodation area and a computing module accommodation area are defined between the bottom plate and the top plate, and the bottom plate is provided with a frame slideway, through which the power source module and the computing modules enter and exit respectively and are fixed in the power source module accommodation area and the computing module accommodation area. The control module is connected to the top plate. The frame of the invention is used for an integrated computing unit, which is small and lightweight. Moreover, the frame structure of the invention is simple, the layout is reasonable, and the cost is low.

What is claimed is:

1. A frame, comprising: a frame body and a control module, the frame body comprising a bottom plate, a top plate and a plurality of side plates, the plurality of side plates being supported between the bottom plate and the top plate, characterized in that: a power source module accommodation area and one or more computing module accommodation areas are defined between the bottom plate and the top plate, and the bottom plate is provided with a plurality of frame slideways, wherein a power source module and one or more computing modules are insertable into or removable from the frame entering and exiting using the plurality of frame slideways on the bottom plate, and being are fixable in the power source module accommodation area and the one or more computing module accommodation areas respectively on the bottom plate after insertion, the plurality of frame slideways each comprising a guiding structure configured to facilitate insertion and removal of the respective module, and the control module being connected to the top plate, the one or more computing module accommodation areas comprise a first computing module accommodation area and a second computing module accommodation area, and the first computing module accommodation area and the second computing module accommodation area are located on two sides of the power source module accommodation area respectively, the bottom plate comprises a first bottom plate portion corresponding to the first computing module accommodation area, a second bottom plate portion corresponding to the power source module accommodation area, and a third bottom plate portion corresponding to the second computing module accommodation area, the plurality of frame slideways comprise bottom plate computing board slideways, the first bottom plate portion and the third bottom plate portion respectively have slot holes arranged in pairs, and the bottom plate computing board slideways are formed between side edges of adjacent slot holes, the second bottom plate portion has drain ports, and wherein sizes of the drain ports of the second bottom plate portion are smaller than sizes of the slot holes of the first bottom plate portion and the third bottom plate portion respectively.

2. The frame according to claim 1, characterized in that the bottom plate and the top plate are respectively sheet metal parts.

3. The frame according to claim 1, characterized in that the plurality of frame slideways further comprise a bottom plate power source slideway, and the bottom plate power source slideway is formed between side edges of the slot holes adjacent to the second bottom plate portion, on the first bottom plate portion and the third bottom plate portion.

4. The frame according to claim 1, characterized in that the second bottom plate portion has a plurality of drain ports arranged in a matrix.

5. The frame according to claim 1, characterized in that the top plate comprises a first top plate portion corresponding to the first computing module accommodation area, a second top plate portion corresponding to the power source module accommodation area, and a third top plate portion corresponding to the second computing module accommodation area, the first top plate portion and the third top plate portion respectively have slot holes arranged in pairs, and top plate computing board slideways corresponding to the bottom plate computing board slideways are formed between side edges of adjacent slot holes.

6. The frame according to claim 5, characterized in that a height of the second top plate portion is higher than heights of the first top plate portion and the third top plate portion.

7. The frame according to claim 5, characterized in that a handle is connected to the top plate, and the highest position of the handle is higher than a top surface of the second top plate portion.

8. The frame according to claim 5, characterized in that the second top plate portion comprises a concave-down power source positioning recess.

9. The frame according to claim 5, characterized in that the second top plate portion comprises a plurality of drain ports.

10. The frame according to claim 5, characterized in that the second top plate portion comprises at least one functional opening.

11. The frame according to claim 5, characterized in that the control module comprises a network cable interface, and the network cable interface is higher than the second top plate portion.

12. The frame according to claim 1, further comprising:

a front side plate, wherein the bottom plate comprises a bottom plate connecting slot, a bottom side edge of the front side plate being connected through the bottom plate connecting slot, and a top portion of the front side plate being connected with the top plate by a connecting piece.

13. The frame according to claim 1, characterized in that it further comprises a control plate connection cover, the control module is connected in the control plate connection cover, and the control plate connection cover is connected to a rear side of the top plate.

14. The frame according to claim 13, further comprising:

a rear side cover, wherein the rear side cover comprises a side plate connecting slot, the control plate connection cover being connected with a top portion of the rear side cover through the side plate connecting slot, and a bottom portion of the rear side cover being connected with the bottom plate through a connecting piece.

15. The frame according to claim 1, characterized in that each of the plurality of side plates is a bar-shaped profile.

16. The frame according to claim 1, characterized in that the power source module has a height greater than a height of the one or more computing modules.

17. The frame according to claim 1, characterized in that it further comprises a control plate connection cover, wherein the control module is mounted within the control plate connection cover, the control plate connection cover is disposed outside of the frame body and extends across and covers an entire rear opening of the frame body, and the plurality of frame slideways extend in a direction that is perpendicular to the control plate connection cover.

* * * * *